(12) United States Patent
Tanaka

(10) Patent No.: US 10,916,957 B2
(45) Date of Patent: Feb. 9, 2021

(54) POWER CONTROL SYSTEM

(71) Applicant: NISSAN MOTOR CO., LTD., Yokohama (JP)

(72) Inventor: Koichi Tanaka, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/638,245

(22) PCT Filed: Aug. 14, 2017

(86) PCT No.: PCT/JP2017/029321
§ 371 (c)(1),
(2) Date: Feb. 11, 2020

(87) PCT Pub. No.: WO2019/035174
PCT Pub. Date: Feb. 21, 2019

(65) Prior Publication Data
US 2020/0169103 A1   May 28, 2020

(51) Int. Cl.
| H02J 7/00 | (2006.01) |
| B60L 53/22 | (2019.01) |
| B60L 50/60 | (2019.01) |
| B60L 50/10 | (2019.01) |
| H02M 3/24 | (2006.01) |
| H02P 27/06 | (2006.01) |

(52) U.S. Cl.
CPC ............ *H02J 7/0068* (2013.01); *B60L 50/10* (2019.02); *B60L 50/66* (2019.02); *B60L 53/22* (2019.02); *H02M 3/24* (2013.01); *H02P 27/06* (2013.01)

(58) Field of Classification Search
CPC ......... H01M 2220/20; H01M 10/0525; H01M 2008/1293; H01M 2250/20; H01M 10/425; H01M 16/006; Y02T 90/40; Y02T 10/70; B60L 2210/14; B60L 50/61; B60L 53/22; B60L 2240/547; H02J 7/0068; H02J 2300/30; Y02E 60/10; H02P 27/06; H02M 3/24
See application file for complete search history.

(56) References Cited

U.S. PATENT DOCUMENTS

| 5,714,874 A | 2/1998 | Bonnefoy |
| 7,402,967 B2 * | 7/2008 | Kurosawa ............... B60L 58/40 |
| | | 318/139 |
| 2004/0217732 A1 | 11/2004 | Zhu et al. |

(Continued)

FOREIGN PATENT DOCUMENTS

| CN | 101180787 A | 5/2008 |
| CN | 101578192 A | 11/2009 |

(Continued)

*Primary Examiner* — Jared Fureman
*Assistant Examiner* — Duc M Pham
(74) *Attorney, Agent, or Firm* — Foley & Lardner LLP

(57) ABSTRACT

A power control system that includes a power generation device that generates low-voltage power, a high-voltage battery that is charged with power generated by the power generation device, an external load that receives power from the high-voltage battery and a power converter that is connected between the power generation device and the high-voltage battery. The power converter includes an insulating power converter.

15 Claims, 11 Drawing Sheets

(56) References Cited

U.S. PATENT DOCUMENTS

| | | | | |
|---|---|---|---|---|
| 2004/0219399 A1* | 11/2004 | Zhu | ................. | H02M 3/28 |
| | | | | 429/431 |
| 2006/0152085 A1 | 7/2006 | Flett et al. | | |
| 2007/0018607 A1* | 1/2007 | Kurosawa | ............... | B60L 58/20 |
| | | | | 320/103 |
| 2008/0081236 A1 | 4/2008 | Kanashiki | | |
| 2008/0094860 A1 | 4/2008 | Falk | | |
| 2010/0025134 A1 | 2/2010 | Hamada et al. | | |
| 2010/0104906 A1 | 4/2010 | Hirakawa et al. | | |
| 2010/0291445 A1 | 11/2010 | Igarashi | | |
| 2011/0133677 A1 | 6/2011 | Franke | | |
| 2017/0207634 A1 | 7/2017 | Katano et al. | | |
| 2018/0370366 A1* | 12/2018 | Suzuki | .............. | H01M 8/04303 |

FOREIGN PATENT DOCUMENTS

| | | | |
|---|---|---|---|
| JP | 7-153474 | A | 6/1995 |
| JP | 2002-280034 | A | 9/2002 |
| JP | 2003-77507 | A | 3/2003 |
| JP | 2003-134691 | A | 5/2003 |
| JP | 2007-20319 | A | 1/2007 |
| JP | 2008-91229 | A | 4/2008 |
| JP | 2008-243728 | A | 10/2008 |
| JP | 2008-271775 | A | 11/2008 |
| JP | 4616247 | B2 | 1/2011 |
| JP | 2011-97727 | A | 5/2011 |
| JP | 2013-38052 | A | 2/2013 |
| JP | 2016-220497 | A | 12/2016 |
| JP | 2017-126477 | | 7/2017 |
| TW | 200711259 | A | 3/2007 |
| WO | WO 2017/104319 | A1 | 6/2017 |

* cited by examiner

POWER CONTROL SYSTEM

TECHNICAL FIELD

The present invention relates to a power control system.

BACKGROUND ART

A power control system has been known, which supplies power to an external load, such as a motor, and charges a battery while controlling power generated at a power generation device, such as a fuel cell or an internal combustion engine. Such a power control system adjusts the output voltage from the power generation device with a power converter, such as a DC/DC converter, in accordance with a load request or the requested amount of charge from a battery.

JP4616247B, for example, proposes a system having a DC/DC converter between a fuel cell stack as a power generation device and an external load or a power storage device, and the system extracts a current pulse from the fuel cell stack via the DC/DC converter in accordance with a requirement from the power storage device.

SUMMARY OF INVENTION

Such a conventional power control system, however, is not intended for a system having a battery voltage always higher than the output voltage from the power generation device.

In view of such circumstances, the present invention aims to provide a power control system having a battery at a higher voltage than the output voltage from the power generation device.

According to an aspect of this invention, there is provided a power control system. The power control system includes a power generation device that generates low-voltage power, a high-voltage battery that is charged with power generated by the power generation device, an external load that receives power from the high-voltage battery and a power converter that is connected between the power generation device and the high-voltage battery. The power converter includes an insulating power converter.

DESCRIPTION OF EMBODIMENTS

The following describes embodiments of the present invention, with reference to the attached drawings.

First Embodiment

Figure 1:
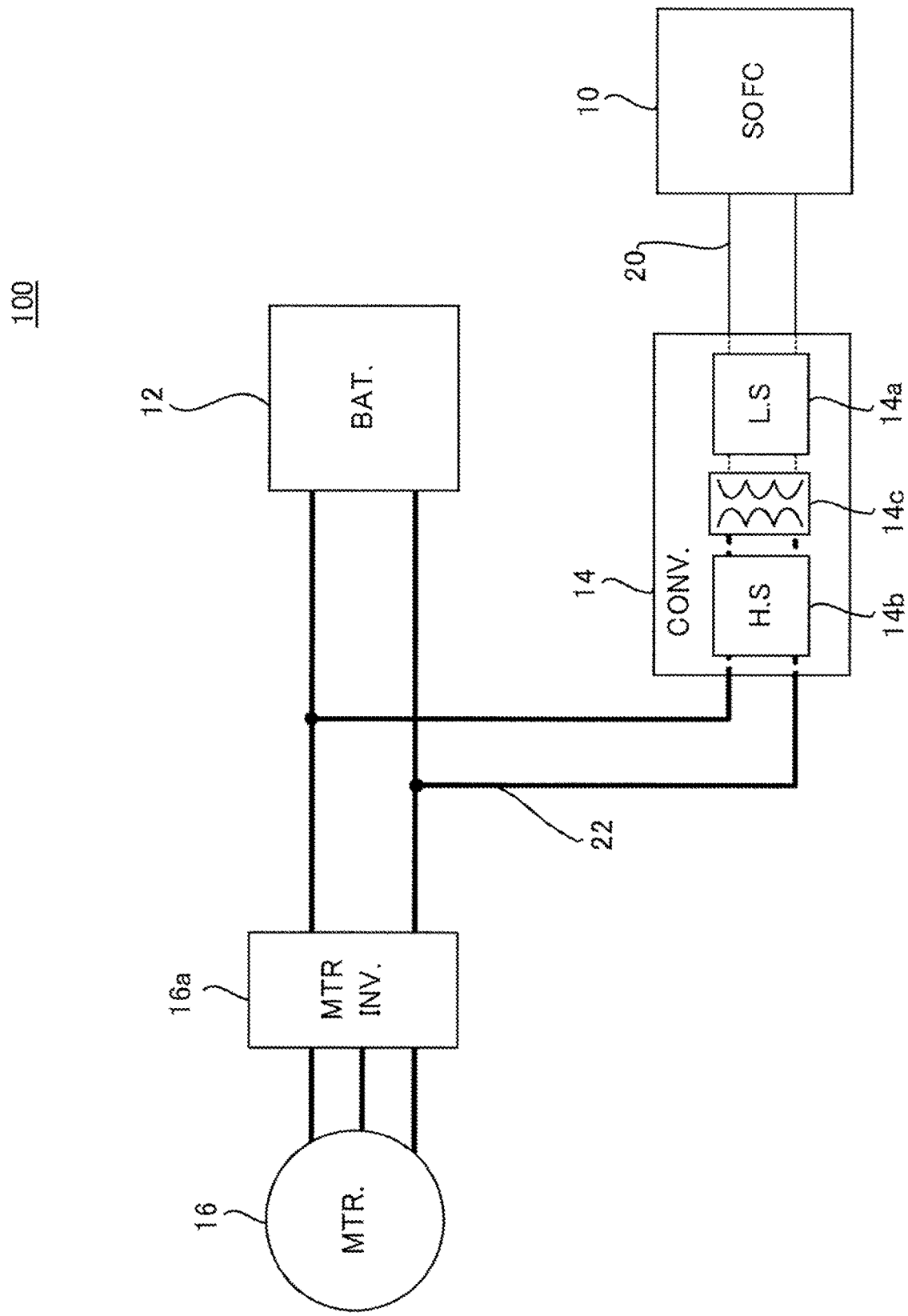
FIG. 1 describes the configuration of a power control system according to a first embodiment.

FIG. 1 schematically shows the configuration of a power control system 100 according to a first embodiment.

As shown in the drawing, the power control system 100 includes: a SOFC (solid oxide fuel cell) 10 as a power generation device; a high-voltage battery 12 charged with power produced (generated) by the SOFC 10; a FC insulating converter 14 as a power converter disposed between the SOFC 10 and the high-voltage battery 12; and a driving motor 16 as an external load that is driven with the power supplied from the high-voltage battery 12.

The SOFC 10 is a SOFC stack including the lamination of cells, each cell having an electrolyte layer made of a solid oxide, such as ceramic, sandwiched between an anode (fuel electrode) and a cathode (air electrode). The SOFC 10 receives fuel gas (hydrogen) at the fuel electrode and oxidation gas (oxygen) at the air electrode for power generation.

When the charged power in the high-voltage battery 12 is insufficient relative to the requested power, for example, the SOFC 10 of the present embodiment outputs (generates) a predetermined current via the FC insulating converter 14 in accordance with the request.

Each unit cell of the SOFC 10 has the output voltage of about 1.0 V. The number of unit cells in the lamination may be adjusted as needed so as to adjust the output voltage from the SOFC 10 to any value. For example, the number of unit cells in the lamination may be set so that the maximum output voltage from the SOFC 10 is in the range of 60 V to 200 V.

However for better safety, the number of unit cells in the lamination of the present embodiment is adjusted to keep the voltage across the SOFC 10 as low as possible. Particularly the number of unit cells in the lamination may be adjusted so that the maximum output voltage from the SOFC 10 is less than 60 V. The SOFC 10 may be configured as a fuel cell system further including auxiliaries for fuel and auxiliaries for air.

In one example, the high-voltage battery 12 includes a secondary battery, such as a lithium ion battery. The high-voltage battery 12 is charged with power generated by the SOFC 10 and adjusted by the FC insulating converter 14. The high-voltage battery 12 supplies power to the driving motor 16 as needed in accordance with a power request from the driving motor 16.

The FC insulating converter 14 adjusts the output voltage from the SOFC 10 to charge the high-voltage battery 12 with the adjusted power, and includes an insulating DC/DC converter. The FC insulating converter 14 includes: a low-voltage side switching unit 14a connecting to a low-voltage line 20 close to the SOFC 10; a high-voltage side switching unit 14b connecting to a high-voltage line 22 that connects to the high-voltage battery 12 and the driving motor 16; and an insulating transformer 14c connecting the low-voltage side switching unit 14a and the high-voltage side switching unit 14b.

The turn ratio of the insulating transformer 14c is set corresponding to a predetermined boosting ratio so as to boost the voltage of the low-voltage line 20 on the input side with the boosting ratio and output the voltage to the high-voltage line 22. The following may refer to a boosting ratio determined based on the turn ratio of the insulating transformer 14c as a "basic boosting ratio".

Although not shown in FIG. 1, the FC insulating converter 14 includes a resonant circuit made up of a capacitor or an reactor for fine adjustment of the basic boosting ratio so as to correspond to the turn ratio of the insulating transformer 14c.

With this configuration, the power control system 100 of the present embodiment performs a predetermined switching control to the low-voltage side switching unit 14a or the high-voltage side switching unit 14b of the FC insulating converter 14, and so adjusts the output voltage from the SOFC 10 (voltage across the low-voltage line 20) so as to supply the power generated by the SOFC 10 to the high-voltage battery 12 in accordance with the requested charge from the high-voltage battery 12.

Especially the FC insulating converter 14 has the insulating transformer 14c, and this allows power supply from the SOFC 10 to the high-voltage battery 12 while electrically insulating the low-voltage line 20 (close to the SOFC 10) and the high-voltage line 22 (close to the high-voltage battery 12) having the FC insulating converter 14 therebetween.

The driving motor 16 includes a three-phase AC motor. The driving motor 16 is driven with power supplied from the high-voltage battery 12. The driving motor 16 is equipped with a motor inverter 16a. The motor inverter 16a converts DC power supplied from the high-voltage battery 12 into AC power.

The power control system 100 may include a relay at the low-voltage line 20, for example, as needed. This relay physically interrupts the connection between the high-voltage battery 12 and the SOFC 10 during the stopping of the SOFC 10.

The power control system 100 having the above-stated configuration charges the high-voltage battery 12 with the power generated by the SOFC 10 while electrically insulating the high-voltage battery 12 and the driving motor 16 on the high-voltage side and the SOFC 10 on the low-voltage side with the FC insulating converter 14.

The power control system 100 according to the first embodiment as stated above has the following advantageous effects.

The power control system 100 of the present embodiment includes: the SOFC 10 as a power generation device to generate low-voltage power; the driving motor 16 as an external load to receive the power from the high-voltage battery 12; the high-voltage battery 12 charged with power generated by the SOFC 10; and the power converter connected between the SOFC 10 and the high-voltage battery 12. The power converter includes the FC insulating converter 14 as an insulating power converter. The "low-voltage power" generated by the SOFC 10 of the present embodiment means that the output voltage from the SOFC 10 is lower than the operating voltage of the high-voltage battery 12.

In this way, the power control system includes the FC insulating converter 14 as the insulating power converter between the high-voltage battery 12 at a high voltage and the SOFC 10 at a low voltage for electrical insulation, and so enables setting of low output voltage from the SOFC 10 while keeping electrical safety. That is, the FC insulating converter 14 suppresses a current flowing from the high-voltage battery 12 to the SOFC 10, and so the present embodiment keeps electrical safety of the SOFC 10 while lowering the output voltage from the SOFC 10.

Note here that the power control system 100 of the present embodiment includes the driving motor 16 connecting to the high-voltage battery 12 in the high-voltage system through the high-voltage line 22, and so enables power supply from the high-voltage battery 12 to the driving motor 16.

In this way the power control system 100 can be a series-manner hybrid system that supplies the power charged in the high-voltage battery 12 to the driving motor 16 while charging the high-voltage battery 12 with the power generated by the SOFC 10 having improved electrical safety as stated above.

The power control system 100 of the present embodiment is mounted on a vehicle (particularly an automobile), and the external load is the driving motor 16. In this way, the power control system 100 of the present embodiment is used for a vehicle as a movable body required having a certain level of electrical safety, and such a vehicle has the advantageous effect from the SOFC 10 having improved electrical safety.

The FC insulating converter 14 includes the low-voltage side switching unit 14a, the high-voltage side switching unit 14b, and the insulating transformer 14c that make up a boosting circuit to boost the power supplied from the SOFC 10 to the high-voltage battery 12 with a predetermined boosting ratio.

This favorably boosts the output voltage from the SOFC 10, and charges the high-voltage battery 12 with such voltage. The SOFC 10 having a lower output voltage as stated above increases a voltage difference between the SOFC 10 and the battery 12. Considering this, the boosting circuit including the FC insulating converter 14 of the present embodiment favorably adjusts the output voltage from the SOFC 10 to an appropriate voltage for charging the high-voltage battery 12. This allows the power control system to include the SOFC 10 having an output voltage smaller relative to the voltage of the high-voltage battery 12.

Especially in the power control system 100 of the present embodiment, the boosting circuit of the FC insulating converter 14 includes the insulating transformer 14c.

This allows the electrical insulation between the SOFC 10 and the high-voltage battery 12 with the insulating transformer 14c as stated above, and allows favorable setting of the boosting ratio of the output voltage from the SOFC 10 by appropriately setting the turn ratio between the primary coil (close to the SOFC 10) and the secondary coil (close to the high-voltage battery 12) of the insulating transformer 14c. In other words, such a simple configuration having the insulating transformer 14c implements both of the functions of electrical insulation between the SOFC 10 and the high-voltage battery 12 and of the boosting circuit.

The power control system 100 according to the first embodiment as stated above may be variously modified. In one example, the output voltage from the SOFC 10 can be appropriately set in accordance with a request from an apparatus equipped with the power control system 100.

In one example, apparatuses, such as automobiles or railroad vehicles, equipped with the power control system 100 may include a component determined as a high-voltage safety requested component that is required to meet a certain safety request, and a predetermined voltage is specified as the standard for the determination. The SOFC 10 then may be configured to have a maximum output voltage less than such a predetermined voltage.

Specifically some apparatuses equipped with the power control system 100 have to comply with regulations on a high-voltage safety requested component that require more strict safety measures from the viewpoint of ensuring electrical safety for human body or the like, and these rules specify the position to dispose such a component in the apparatus or the necessity of a predetermined insulating treatment. The determination whether a certain component is such a high-voltage safety requested component or not is typically made based on the magnitude of the operating voltage of such a component as the standard.

In view of such circumstances, a voltage as the standard for a determination on a high-voltage safety requested component, which is specified depending on an apparatus equipped with the power control system 100, may be set as the predetermined voltage, whereby the maximum output voltage of the SOFC 10 can be less than the voltage for a determination on a high-voltage safety requested component.

This excludes the SOFC 10 from the high-voltage safety requested components that are specified from the viewpoint of electrical safety of the apparatus equipped with the power control system 100.

Specifically the SOFC 10 may be configured to have the maximum output voltage less than 60 V. Such setting of the maximum output voltage for the SOFC 10 securely excludes the SOFC 10 from the high-voltage safety requested components when the power control system 100 of the present embodiment is mounted especially on an automobile.

For the safety reason, automobiles are required not to include high-voltage safety requested components in the front region and the rear region (hereinafter they may be simply called a "crash region") that would have a relatively serious damage during car crash. The voltage as the standard for determination on the high-voltage safety requested components is specified basically at 60 V.

The SOFC 10 has the maximum output voltage less than 60 V, and so is excluded from the high-voltage safety requested components. Such a SOFC 10 therefore can be installed in the front region and the rear region of the vehicle as well, where high-voltage safety requested components are not allowed to dispose.

If such a SOFC 10 having the maximum output voltage less than 60 V directly connects to a high-voltage system electrically, such as the high-voltage battery 12, the SOFC 10 together with the high-voltage battery 12 becomes a high-voltage safety requested component.

As described above, the power control system 100 of the present embodiment has the FC insulating converter 14 that electrically insulates between the SOFC 10 and the high-voltage battery 12 or the driving motor 16. This makes the SOFC 10 a component separated from the high-voltage system including the high-voltage battery 12. Due to such a FC insulating converter 14, the SOFC 10 is securely excluded from a high-voltage safety requested component. As a result, the SOFC 10 can be disposed at any region including the crash region of an automobile, and so this improves the degree of freedom for vehicle layout.

Second Embodiment

The following describes a second embodiment. Like numbers indicate like components similar to those in the first embodiment, and their detailed descriptions are omitted.

Figure 2:
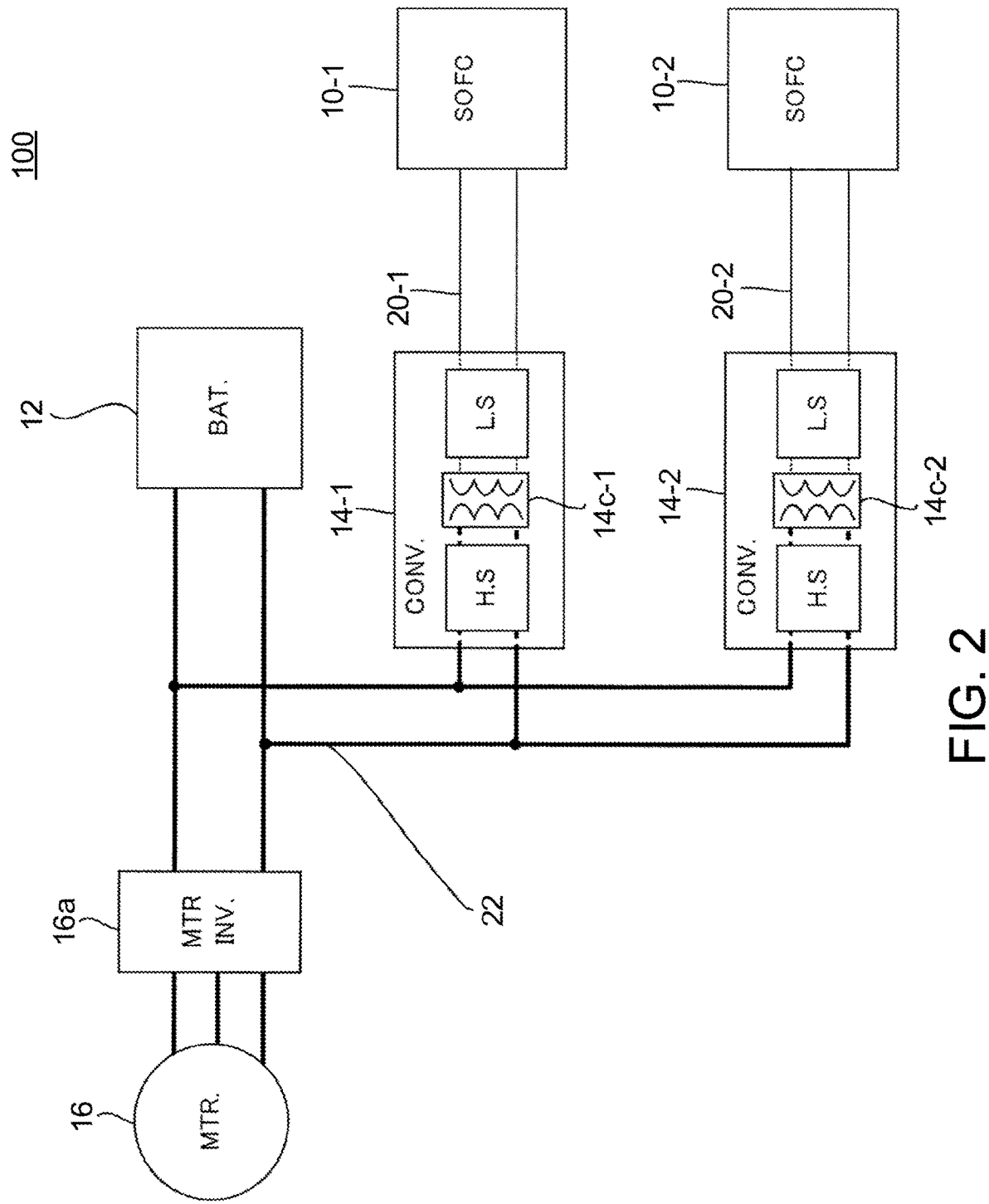
FIG. 2 describes the configuration of a power control system according to a second embodiment.

FIG. 2 describes the configuration of a power control system 100 in the second embodiment.

As shown in the drawing, the power control system 100 of the present embodiment includes two SOFCs 10-1 and 10-2. Each of the two SOFCs 10-1 and 10-2 connects to the corresponding FC insulating converter 14 as described in the first embodiment. Hereinafter the FC insulating converter 14 connecting to the SOFC 10-1 is called a "FC insulating converter 14-1" and the FC insulating converter 14 connecting to the SOFC 10-2 is called a "FC insulating converter 14-2".

The following describes one of the reasons for having these two SOFCs 10-1 and 10-2 in the present embodiment. Such a reason described in the following is not intended to limit the configuration of the present embodiment.

As described above, a SOFC 10 having a small output voltage improves the electrical safety of the SOFC 10. When the requested amount of charge from the high-voltage battery 12 is relatively large, the generation power requested for the SOFC 10 will be large. In such a case, current extracted from the SOFC 10 has to be increased to obtain such requested generation power. The current extracted from a single SOFC 10 having a small output voltage, however, is limited.

The power control system 100 of the present embodiment therefore disposes the two SOFCs 10-1 and 10-2 in parallel from the viewpoint of favorably keeping the requested generation power from such SOFCs 10 having a small output voltage.

In another configuration including the two SOFCs 10-1 and 10-2 in the parallel arrangement, a single FC insulating converter 14 can be used for collective control of the current extracted from these two SOFCs 10-1 and 10-2. These two SOFCs 10-1 and 10-2 may have different output characteristics (IV characteristics) due to their individual differences.

The same extracted current from these two SOFCs 10-1 and 10-2 having different output characteristics in this way causes the SOFCs 10-1 and 10-2 to have different voltages because the degree of voltage reduction is different between these SOFCs 10-1 and 10-2. Especially a large extracted current increases the difference in voltage due to different output characteristics (see FIG. 5).

To avoid this, when a single FC insulating converter 14 collectively controls the current extracted from these two SOFCs 10-1 and 10-2, the current has to be extracted considering lower characteristics between them. That is, one of the two SOFCs 10-1 and 10-2 having lower output characteristics becomes a bottleneck, and this causes a failure of the SOFC having higher output characteristics to deliver a good performance.

Considering such a situation, the present inventors arrived at the configuration of connecting the SOFCs 10-1 and 10-2 to their corresponding FC insulating converters 14-1 and 14-2, respectively, so as to control the extracted current in accordance with their output characteristics. This enables suitable current extracted from both of the SOFCs 10-1 and 10-2 in accordance with their output characteristics.

The power control system 100 according to the second embodiment as stated above has the following advantageous effects.

The power control system 100 of the present embodiment includes the two SOFCs 10, and these SOFCs 10-1 and 10-2 connect to the FC insulating converters 14-1 and 14-2, respectively.

This enables more favorable extracted current in accordance with the requested generation power as compared with the configuration having a single SOFC 10. Additionally this enables favorable extracted current from the two SOFCs 10-1 and 10-2 in accordance with their output characteristics.

The present embodiment is configured having different systems including the system of the SOFC 10-1 and the FC insulating converter 14-1 and the system of the SOFC 10-2 and the FC insulating converter 14-2. Unlike the configuration of the two SOFCs 10-1 and 10-2 connecting to a single FC insulating converter 14, the SOFC 10-1, the FC insulating converter 14-1, the SOFC 10-2 and the FC insulating converter 14-2 are appropriately distributed in the layout.

When the power control system 100 is mounted in a vehicle, this configuration improves the degree of freedom of the layout of these SOFCs 10-1 and 10-2 and FC insulating converters 14-1 and 14-2.

The power control system 100 of the present embodiment provides different wiring systems for a low-voltage line 20-1 connecting the SOFC 10-1 and the FC insulating converter 14-1 and for a low-voltage line 20-2 connecting the SOFC 10-2 and the FC insulating converter 14-2. This reduces the current flowing through each of these low-voltage lines 20-1 and 20-2 as compared with the configuration of a single wiring system connecting the two SOFCs 10-1 and 10-2 to a single FC insulating converter 14.

In this case thinner wire can be used for the low-voltage line 20-1 and the low-voltage line 20-2, and so the wire can be bent and deformed with a higher curvature. This improves the degree of freedom of wire layout, and so further improves the degree of freedom of the layout of the SOFCs 10 and the FC insulating converters 14.

The configuration of the two SOFCs 10-1 and 10-2 connecting to a single FC insulating converter 14 also requires circuit components necessary for the output control of these SOFCs 10-1 and 10-2.

The configuration as in the present invention including the distributed FC insulating converter 14-1 and FC insulating converter 14-2 for the two SOFCs 10-1 and 10-2, respectively, enables the distribution of the circuit components necessary for the output control of the SOFCs 10-1 and 10-2. The current flowing through the circuits of the FC insulating converter 14-1 and the FC insulating converter 14-2 is smaller than in the configuration of the two SOFCs 10-1 and 10-2 connecting to a single FC insulating converter 14.

Each of these FC insulating converters 14-1 and 14-2 therefore can be configured without substantially increasing the number of components in total from the number of the components of a single FC insulating converter 14, and so they can be compact relative to the configuration including a single FC insulating converter 14.

This means that the configuration as in the present embodiment having the SOFCs 10-1 and 10-2 connecting to their corresponding FC insulating converters 14-1 and 14-2 suppresses an increase in the overall size and the cost of the FC insulating converters 14-1 and 14-2.

Third Embodiment

The following describes a third embodiment. Like numbers indicate like components similar to those in the first embodiment or the second embodiment, and their detailed descriptions are omitted. The present embodiment describes power control based on the configuration of the power control system 100 in the second embodiment.

Figure 3:
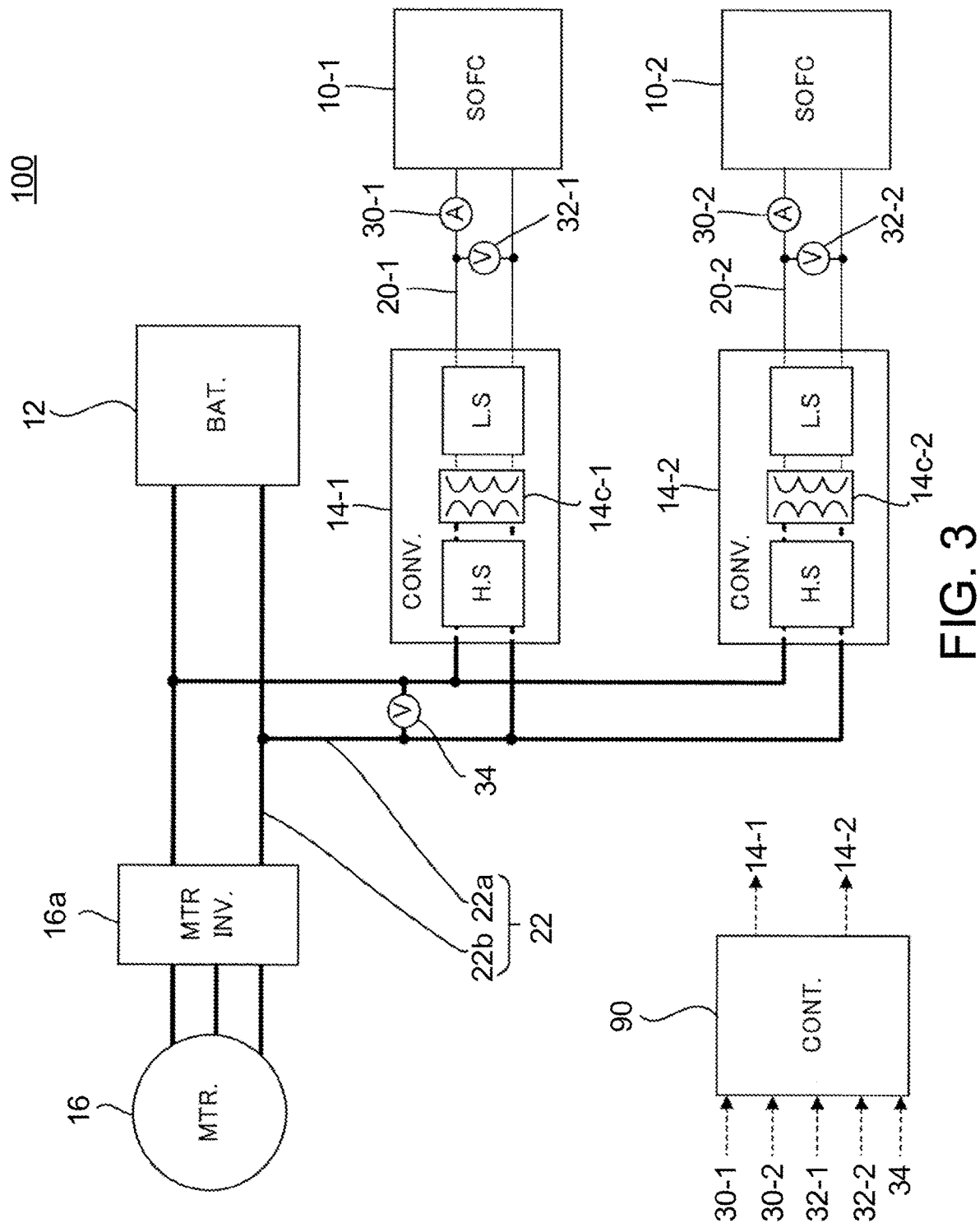
FIG. 3 describes the configuration of a power control system according to a third embodiment.

FIG. 3 describes the configuration of a power control system 100 in the present embodiment. As shown in the drawing, the power control system 100 of the present embodiment includes, in addition to the configuration of FIG. 2, a low-voltage side current sensor 30-1 and a low-voltage side voltage sensor 32-1 disposed at the low-voltage line 20-1 between the SOFC 10-1 and the FC insulating converter 14-1, a low-voltage side current sensor 30-2 and a low-voltage side voltage sensor 32-2 disposed at the low-voltage line 20-2 between the SOFC 10-2 and the FC insulating converter 14-2, and a high-voltage side voltage sensor 34 disposed at the high-voltage line 22 on the output side of the FC insulating converter 14-1 and the FC insulating converter 14-2.

The low-voltage side current sensor 30-1 detects a current (hereinafter this may be simply called a "first low-voltage side current Ilow1") of the low-voltage line 20-1 corresponding to the current extracted from the SOFC 10-1. The low-voltage side voltage sensor 32-1 detects a voltage (hereinafter this may be simply called a "first low-voltage side voltage Vlow1") corresponding to the output voltage from the SOFC 10-1 (input voltage of the FC insulating converter 14-1).

The low-voltage side current sensor 30-2 detects a current (hereinafter this may be simply called a "second low-voltage side current Ilow2") of the low-voltage line 20-2 corresponding to the current extracted from the SOFC 10-2. The low-voltage side voltage sensor 32-2 detects a voltage (hereinafter this may be simply called a "second low-voltage side voltage Vlow2") corresponding to the output voltage from the SOFC 10-2 (input voltage of the FC insulating converter 14-2).

The high-voltage side voltage sensor 34 detects a voltage (hereinafter this may be simply called a "high-voltage side voltage Vhigh") of the high-voltage line 22 corresponding to the output voltage from the FC insulating converters 14-1 and 14-2.

The power control system 100 further includes a controller 90 that is a transformer individual-control unit to control the FC insulating converters 14-1 and 14-2.

The controller 90 includes a computer having a central processing unit (CPU), a read only memory (ROM), a random access memory (RAM), and an input/output interface (I/O interface), and especially includes a microcomputer. The controller 90 is programed to execute the processing of the present embodiment. The controller 90 may be a single device or a plurality of devices so as to conduct distributed processing of various types of control of the present embodiment.

The controller 90 of the present embodiment switching-controls the FC insulating converter 14-1 and the FC insulating converter 14-2 to control their boosting ratios, based on the first low-voltage side current detection value $Ilow1d$, the first low-voltage side voltage detection value $Ilow1d$, the second low-voltage side current detection value $Ilow2d$, the second low-voltage side voltage detection value $Ilow2d$, and the high-voltage side voltage detection value $Vhighd$ detected by the low-voltage side current sensor 30-1, the low-voltage side voltage sensor 32-1, the low-voltage side current sensor 30-2, the low-voltage side voltage sensor 32-2, and the high-voltage side voltage sensor 34. The following describes the control by the controller 90 in more details.

Figure 4:
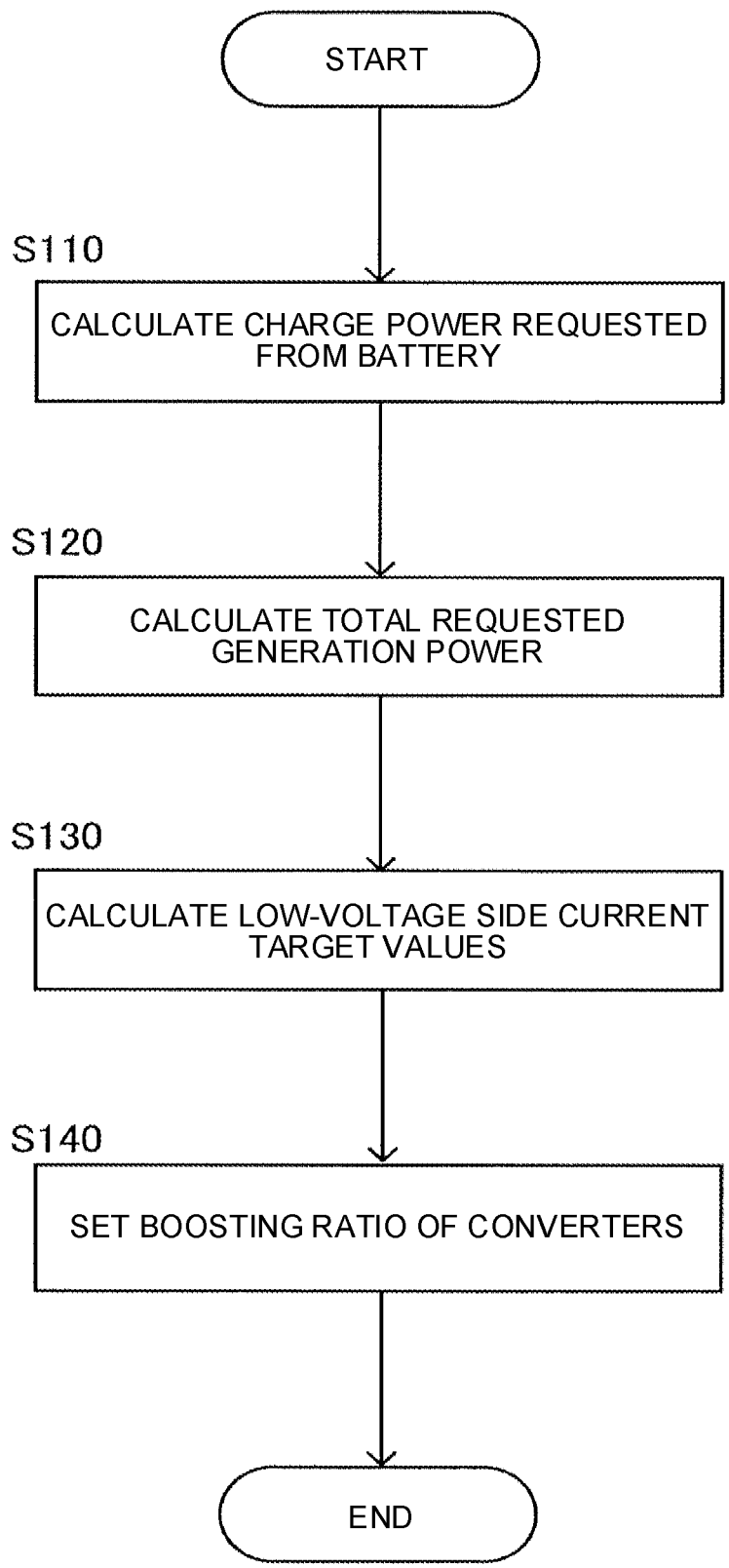
FIG. 4 is a flowchart showing the procedure of converter control in the third embodiment.

FIG. 4 is a flowchart to describe the control mode of the power control system 100 of the present embodiment. The order of the steps shown in the flowchart is not limited to the below-described order, and the order may be changed to the extent possible.

As shown in the drawing, at step S110, the controller 90 calculates acceptable power (requested charge power) of the high-voltage battery 12 based on a detection value of a state of charge (SOC) sensor not shown, for example.

At step S120, the controller 90 calculates total requested generation power of the SOFC 10-1 and the SOFC 10-2 based on the calculated requested charge power of the high-voltage battery 12.

At step S130, the controller 90 calculates a first low-voltage side current target value Ilow1t and a second low-voltage side current target value Ilow2t. Specifically the controller 90 calculates the first low-voltage side current target value Ilow1t and the second low-voltage side current target value Ilow2t so as to meet the calculated requested generation power and so that a deviation between an acquired first low-voltage side voltage detection value Ilow1d and second low-voltage side voltage detection value Ilow2d is an allowable value ΔV or less.

In other words, the controller 90 calculates the first low-voltage side current target value Ilow1t (extracted current target value of the SOFC 10-1) and the second low-voltage side current target value Ilow2t (extracted current target value of the SOFC 10-2) so as to meet the requested charge power of the high-voltage battery 12 and reduce a difference between the first low-voltage side voltage Vlow1 (voltage across the SOFC 10-1) and the second low-voltage side voltage Vlow2 (voltage across the SOFC 10-2).

Figure 5:
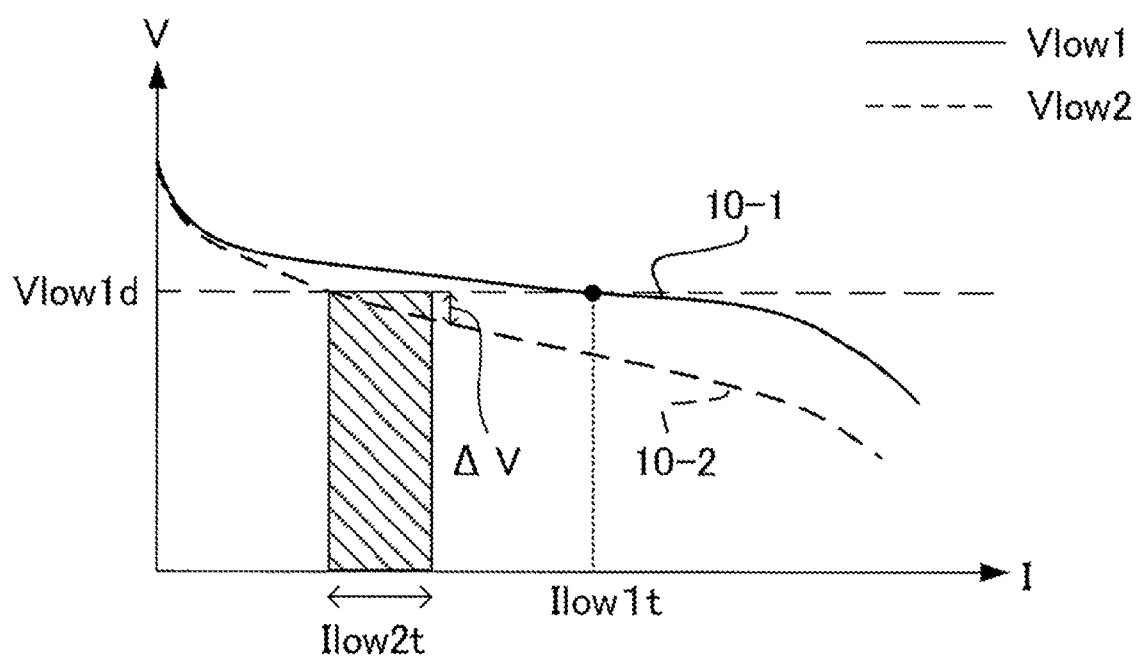
FIG. 5 is a graph describing a difference in output characteristics between two SOFCs.

FIG. 5 roughly shows the IV curves of the two SOFC 10-1 and SOFC 10-2 having different output characteristics. In this drawing, the solid curve indicates the IV curve of the SOFC 10-1, and the dashed curve indicates the IV curve of the SOFC 10-2. In this way the present embodiment assumes the case where the SOFC 10-1 has higher output characteristics than that the SOFC 10-2 has.

As is understood from the drawing, when the SOFCs 10-1 and 10-2 have different output characteristics, their output voltages will be different even having the same extracted current. Especially such a difference between the first low-voltage side voltage Vlow1 and the second low-voltage side voltage Vlow2 increases at a region of a large extracted current. From the viewpoint of reducing a difference between the first low-voltage side voltage Vlow1 and the second low-voltage side voltage Vlow2, the present embodiment sets the first low-voltage side current target value Ilow1t and the second low-voltage side current target value Ilow2t that are target values of the extracted current from the SOFCs 10-1 and 10-2 in accordance with their output characteristics.

In one example, when the value of the first low-voltage side current Ilow1 indicated with the dotted line in FIG. 5 is set as the first low-voltage side current target value Ilow1t, the controller 90 selects a second low-voltage side current target value Ilow2t while considering the total requested generation power from a region (hatched region in FIG. 5) where the second low-voltage side voltage detection value Vlow2d corresponding to the output voltage from the SOFC 10-2 is within the range of the allowable value ΔV or less relative to the first low-voltage side voltage detection value Vlow1d when the current corresponding to the first low-voltage side current target value Ilow1t is extracted from the SOFC 10-1.

At step S140, the controller 90 controls the boosting ratios of the FC insulating converter 14-1 and the FC insulating converter 14-2 so that the first low-voltage side current detection value Ilow1d and the second low-voltage side current detection value Ilow2d get closer to the first low-voltage side current target value Ilow1t and the second low-voltage side current target value Ilow2t, respectively, calculated at step S130.

As described above, the present embodiment implements switching control of the FC insulating converters 14-1 and 14-2 so as to enable setting of the extracted current suitable for the output characteristics of the two SOFCs 10-1 and 10-2.

The power control system 100 according to the third embodiment as stated above has the following advantageous effects.

The power control system 100 of the present embodiment further includes the controller 90 configured to individually control the FC insulating converter 14-1 and the FC insulating converter 14-2 connecting to the SOFC 10-1 and the SOFC 10-2, respectively.

This implements the control to individually adjust the power generated (output current) from the SOFC 10-1 and the SOFC 10-2 in accordance with their different output characteristics.

Especially the present embodiment sets the extracted current of the SOFC 10-1 and the SOFC 10-2 so that a difference between the first low-voltage side voltage Vlow1 and the second low-voltage side voltage Vlow2 that are the output voltages from the SOFC 10-1 and the SOFC 10-2 is a predetermined value (allowable value ΔV) or less (step S130 in FIG. 4).

This sets suitable extracted currents in accordance with the output characteristics of the SOFC 10-1 and the SOFC 10-2 while suppressing a difference in output voltage between the SOFC 10-1 and the SOFC 10-2 due to their different output characteristics.

Fourth Embodiment

The following describes a fourth embodiment. Like numbers indicate like components similar to those in the first to the third embodiments, and their detailed descriptions are omitted.

Figure 6:
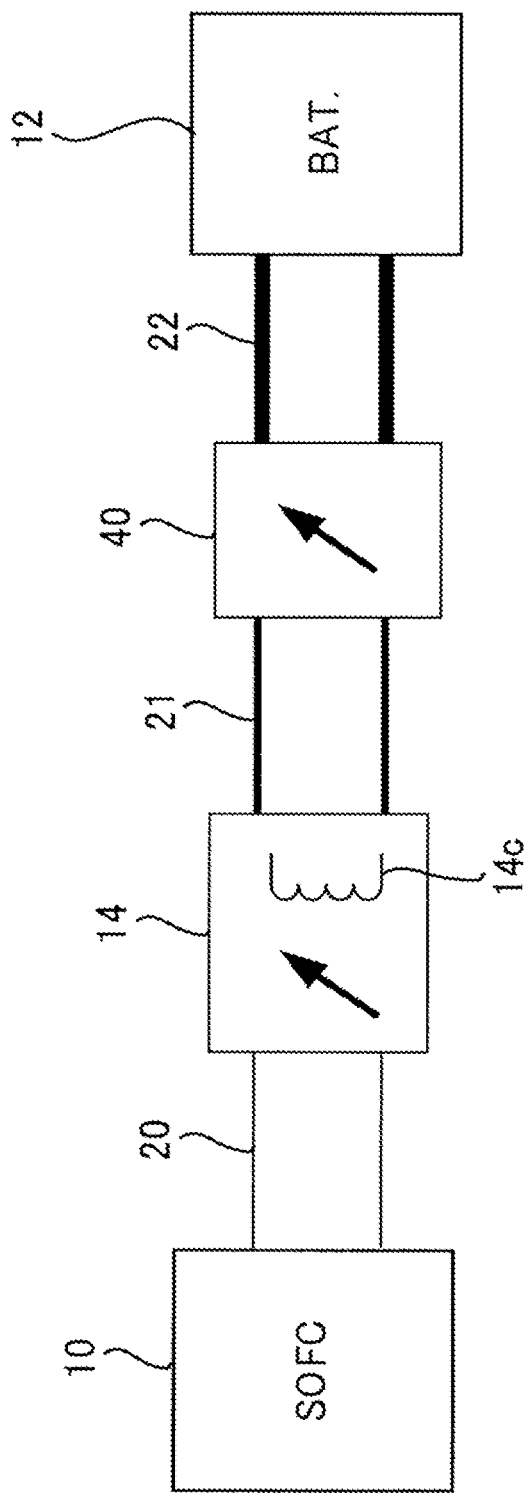
FIG. 6 describes the configuration of a power control system according to a fourth embodiment.

FIG. 6 describes the configuration of a power control system 100 according to the present embodiment. For simplicity, FIG. 6 shows the major configuration of the power control system 100 only.

As shown in the drawing, the power converter of the power control system 100 of the present embodiment includes a FC insulating converter 14 described in the first embodiment as well as a non-insulating boosting converter 40 that is an auxiliary booster configured to boost the output voltage from the FC insulating converter 14 with a predetermined boosting ratio.

The non-insulating boosting converter 40 is configured as a charge pump type boosting converter, for example, that enables setting of a boosting ratio in a certain range by switching control. The non-insulating boosting converter 40 of the present embodiment connects between the FC insulating converter 14 and the high-voltage battery 12.

In the power control system 100 of the present embodiment having such a configuration, the FC insulating converter 14 boosts the output voltage from the SOFC 10 in the low-voltage line 20 with a basic boosting ratio, and outputs the voltage to a middle-voltage line 21. The non-insulating boosting converter 40 then boosts the voltage at the middle-voltage line 21 with a predetermined boosting ratio (hereinafter this may be called an "auxiliary boosting ratio") and outputs the voltage to the high-voltage line 22.

In this way the present embodiment boosts the output voltage from the SOFC 10 in two stages in the order of the FC insulating converter 14 and the non-insulating boosting converter 40, and then supplies the voltage to the high-voltage battery 12.

Specifically in the present embodiment, the boosting circuit (insulating transformer 14c) of the FC insulating converter 14 in the first stage boosts the output voltage from the SOFC 10 with a relatively large basic boosting ratio, and the non-insulating boosting converter 40 in the second stage controls while precisely adjusting the auxiliary boosting ratio. As a result the FC insulating converter 14 and the non-insulating boosting converter 40 of the present embodiment favorably adjust a substantial boosting ratio (basic boosting ratio x auxiliary boosting ratio) of the output voltage from the SOFC 10 in accordance with the requested charge power of the high-voltage battery 12, for example.

More specifically in the power control system 100 of the present embodiment, basic boosting by the FC insulating converter 14 boosts the output voltage from the SOFC 10 typically close to a desired target voltage in accordance with the requested charge power of the high-voltage battery 12.

In some cases, however, the boosting ratio of the output voltage from the SOFC 10 may have to be adjusted as needed in a relatively short time due to a variation of the requested power of the high-voltage battery 12, for example. The non-insulating boosting converter 40 of the present embodiment favorably deals with such a case as well to substantially adjust the output voltage from the SOFC 10 in a relatively short time.

The power control system 100 according to the fourth embodiment as stated above has the following advantageous effects.

The power converter in the power control system 100 of the present embodiment further includes the non-insulating boosting converter 40 that is an auxiliary booster to boost the output voltage from the SOFC 10 with a predetermined boosting ratio.

This allows the FC insulating converter 14 to boost the output voltage from the SOFC 10 roughly to a desired voltage in accordance with the requested charge power of the high-voltage battery 12, for example, and allows the non-insulating boosting converter 40 to favorably deal with the case of substantially adjusting the boosting ratio of the output voltage from the SOFC 10 in a relatively short time.

Fifth Embodiment

The following describes a fifth embodiment. Like numbers indicate like components similar to those in the first to the fourth embodiments, and their detailed descriptions are omitted. The present embodiment describes one example of power control based on the configuration of the power control system 100 in the fourth embodiment.

Figure 7:
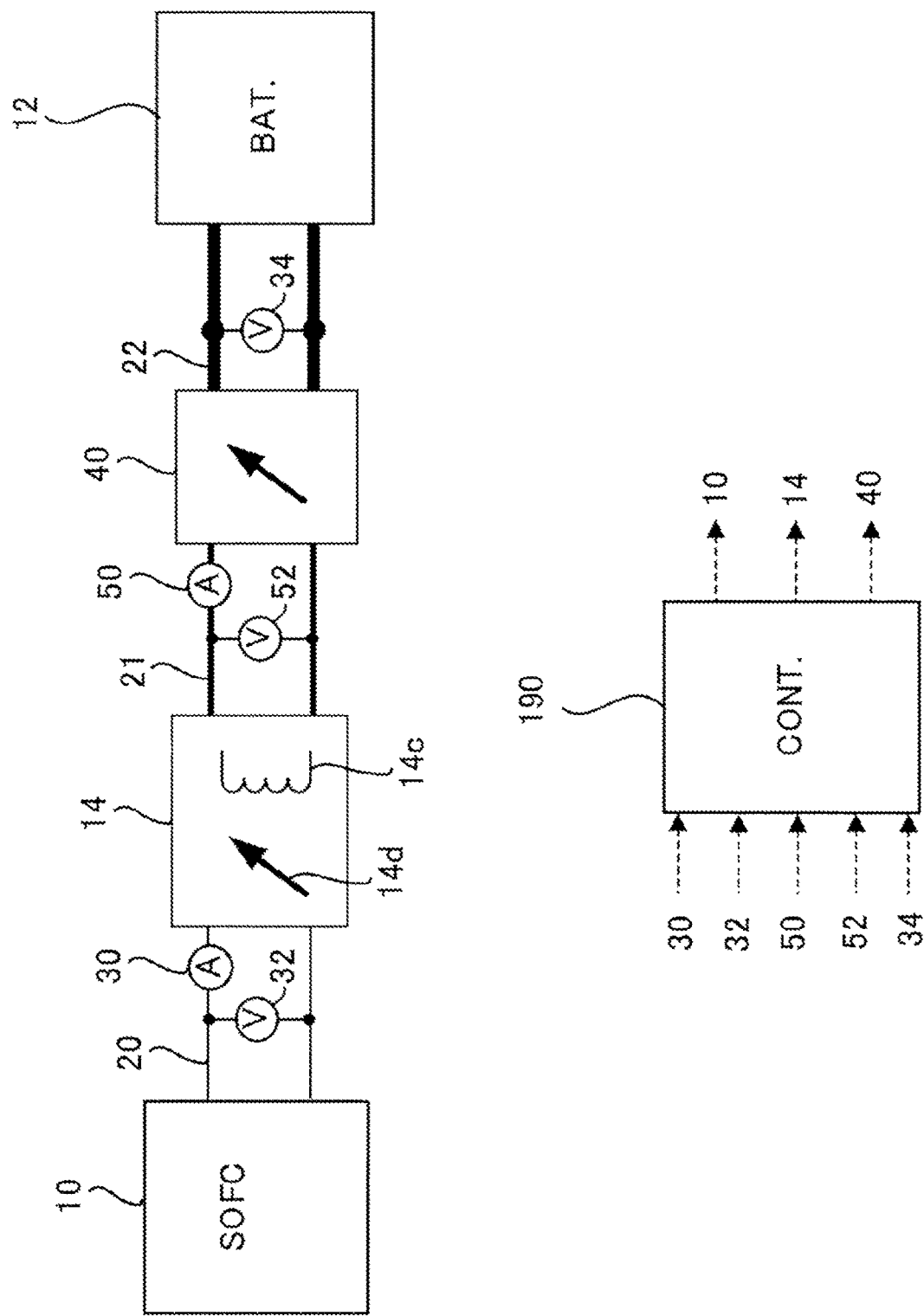
FIG. 7 describes the configuration of a power control system according to a fifth embodiment.

FIG. 7 describes the configuration of a power control system 100 in the present embodiment. As shown in the drawing, the power control system 100 of the present embodiment includes, in addition to the configuration of FIG. 6, a low-voltage side current sensor 30 and a low-voltage side voltage sensor 32 disposed in the low-voltage line 20, a middle-voltage side current sensor 50 and a middle-voltage side voltage sensor 52 disposed in the middle-voltage line 21, and a high-voltage side voltage sensor 34 disposed in the high-voltage line 22.

The low-voltage side current sensor 30 detects a low-voltage side current Ilow corresponding to the output current from the SOFC 10. The low-voltage side voltage sensor 32 detects a low-voltage side voltage Vlow that is a voltage across the low-voltage line 20.

The middle-voltage side current sensor 50 detects a middle-voltage side current Imed corresponding to the input current from the FC insulating converter 14 to the non-insulating boosting converter 40. The middle-voltage side voltage sensor 52 detects a middle-voltage side voltage Vmed that is a voltage across the middle-voltage line 21.

The high-voltage side voltage sensor 34 detects a high-voltage side voltage Vhigh that is a voltage (corresponding to the voltage across the high-voltage battery 12) across the high-voltage line 22.

The power control system 100 further includes a controller 190 to control the FC insulating converter 14 and the non-insulating boosting converter 40.

The controller 190 includes a computer having a central processing unit (CPU), a read only memory (ROM), a random access memory (RAM), and an input/output interface (I/O interface), and especially includes a microcomputer. The controller 190 is programed to execute the processing of the present embodiment. The controller 190 may be a single device or a plurality of devices so as to conduct distributed processing of various types of control of the present embodiment.

The controller 190 of the present embodiment controls the FC insulating converter 14 and the non-insulating boosting converter 40 based on the low-voltage side current detection value Ilowd, the low-voltage side voltage detection value Vlowd, the middle-voltage side current detection value Imedd, the middle-voltage side voltage detection value Vmedd, and the high-voltage side voltage detection value Vhighd detected by the low-voltage side current sensor 30, the low-voltage side voltage sensor 32, the middle-voltage side current sensor 50, the middle-voltage side voltage sensor 52 and the high-voltage side voltage sensor 34. The following describes the control by the controller 190 of the present embodiment in more details.

Figure 8:
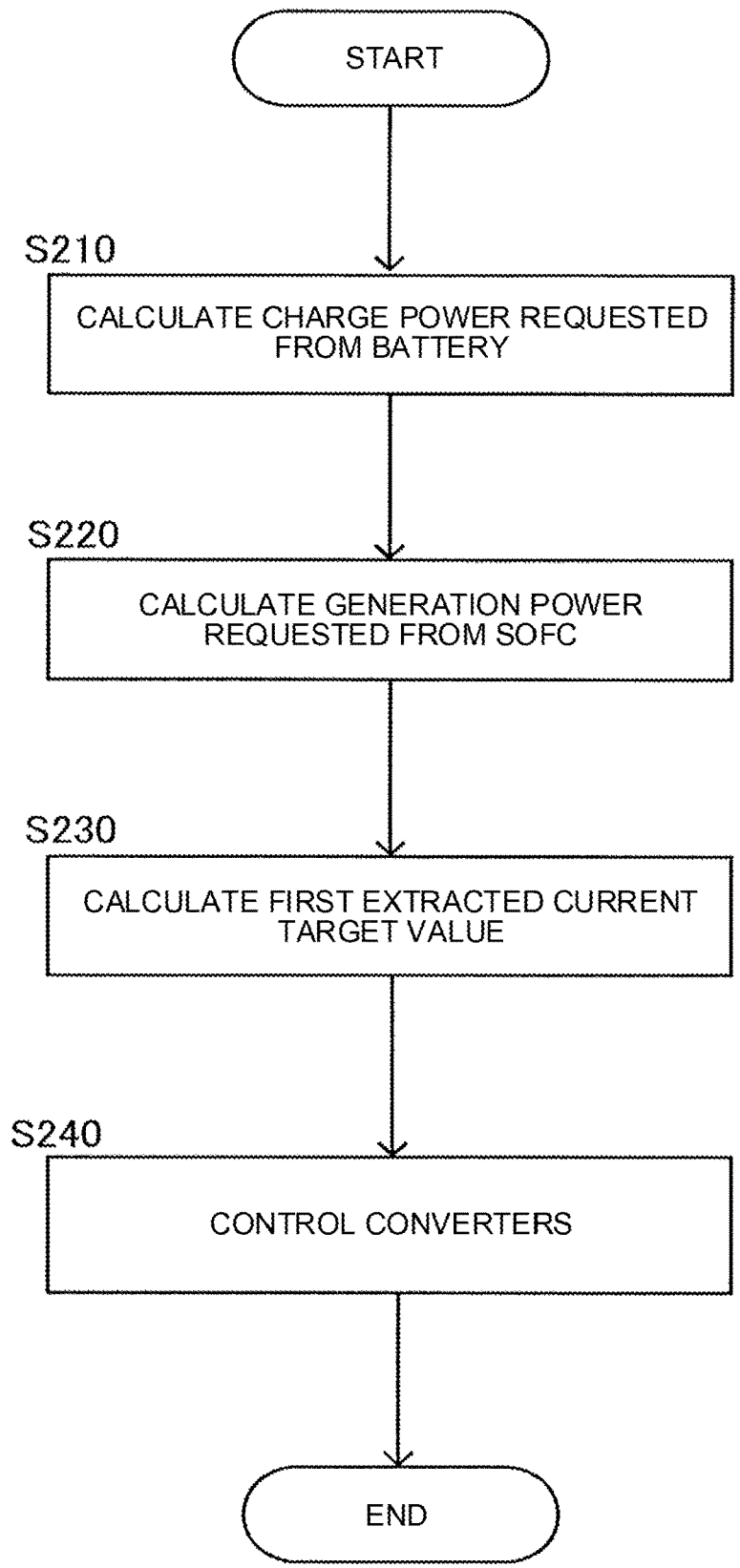
FIG. 8 is a flowchart showing the procedure of converter control in the fifth embodiment.

FIG. 8 is a flowchart to describe the control mode of the power control system 100 of the present embodiment. The order of the steps shown in the flowchart is not limited to the below-described order, and the order may be changed to the extent possible.

As shown in the drawing, at step S210, the controller 190 calculates acceptable power (requested charge power) of the high-voltage battery 12 based on a detection value (or an estimated value) of the amount of charge of the high-voltage battery 12 detected by a state of charge (SOC) sensor not shown, for example.

At step S220, the controller 190 calculates requested generation power of the SOFC 10 based on the calculated requested charge power of the high-voltage battery 12.

At step S230, the controller 190 calculates an extracted current correction target value (hereinafter this may be called a "first extracted current target value") of the SOFC 10 based on the calculated requested generation power and the low-voltage side voltage detection value Vlowd. That is, the first extracted current target value is a target value of the extracted current (low-voltage side current Ilow) of the SOFC 10 that is calculated from the viewpoint of meeting requested charge power of the high-voltage battery 12 and limiting the voltage of the low-voltage line 20 (low-voltage side voltage Vlow) so as not to exceed a certain upper limit.

Specifically the controller 190 of the present embodiment firstly calculates a basic extracted current target value of the SOFC 10 based on the calculated requested generation power. Then the controller 190 corrects the basic extracted current target value so that the low-voltage side voltage detection value Vlowd is less than a predetermined upper-limit voltage Vlim (e.g., 60 V) based on the output characteristics (IV characteristics) of the SOFC 10, and sets the corrected value as the first extracted current target value.

The first extracted current target value is calculated from the viewpoint of meeting requested generation power and limiting the low-voltage side voltage detection value Vlowd, and so is set at the basic extracted current target value or more that is determined based on the original first extracted current target value.

At step S240, the controller 190 controls the FC insulating converter 14 and the non-insulating boosting converter 40 based on the first extracted current target value calculated at the step S230 and the high-voltage side voltage detection value Vhighd.

Specifically the controller 190 switching-controls the FC insulating converter 14 and the non-insulating boosting converter 40 so that the low-voltage side current detection value Ilowd gets closer to the first extracted current target value and so adjusts the total boosting ratio (basic boosting ratio+auxiliary boosting ratio).

In this way the present embodiment provides one mode to control the converters so as to keep the low-voltage side voltage Vlow less than the upper-limit voltage Vlim and charge the high-voltage battery 12 with desired power.

The power control system 100 according to the fifth embodiment as stated above has the following advantageous effects.

In the power control system 100 of the present embodiment, the non-insulating boosting converter 40 is disposed between the FC insulating converter 14 and the high-voltage battery 12. That is, the present embodiment provides a system that boosts the output voltage from the SOFC 10 in two stages in the order of the FC insulating converter 14 and the non-insulating boosting converter 40, and supplies the voltage to the high-voltage battery 12.

The present embodiment further has the controller 190 that is a boosting control unit to control the FC insulating converter 14 and the non-insulating boosting converter 40. The controller 190 controls the boosting ratio of the non-insulating boosting converter 40 at least based on the output voltage from the SOFC 10 (low-voltage side voltage Vlow) and the voltage of the high-voltage battery 12 (high-voltage side voltage Vhigh).

With this configuration, boosting of the output voltage from the SOFC 10 in two stages by the FC insulating converter 14 and the non-insulating boosting converter 40 can be favorably executed through a control of the non-insulating boosting converter 40 in accordance with the requested charge power of the high-voltage battery 12.

The controller 190 of the present embodiment limits the low-voltage side voltage Vlow corresponding to the output voltage from the SOFC 10 to be less than a predetermined value (upper-limit voltage Vlim) (step S230 in FIG. 8).

In this way the present embodiment provides a specific example of the embodiment to supply power to the high-voltage battery 12 in accordance with the requested charge power, and keep the low-voltage side voltage Vlow to be less than a certain value.

In the power control system 100 of the present embodiment, the insulating transformer 14c of the FC insulating converter 14 electrically insulates between the low-voltage line 20 and the middle-voltage line 21. With this configuration, when the low-voltage side voltage Vlow as the voltage across the low-voltage line 20 is kept less than the upper-limit voltage Vlim, the operating voltage of the low-voltage line 20 and the SOFC 10 on the input side of the FC insulating converter 14 can be substantially less than the upper-limit voltage Vlim. That is, this improves electrical safety of the low-voltage line 20 and the SOFC 10.

Especially when the power control system 100 of the present embodiment is mounted on an automobile, the upper-limit voltage Vlim may be set at a value less than 60 V. This means that the low-voltage line 20 and the SOFC 10 can be components substantially having the operating voltage less than 60 V, and so they can be excluded from the above-stated high-voltage safety requested components.

As a result, when the power control system 100 of the present embodiment is mounted in an automobile, this configuration improves the degree of freedom of the layout of these low-voltage line 20 and SOFC 10 on the vehicle.

In the power control system 100 of the present embodiment, the SOFC 10 may be configured to have a substantially maximum output voltage less than 60 V. Together with the control to keep the low-voltage side voltage Vlow to be less than 60 V as stated above, this configuration reliably keeps the components in the low-voltage system, including the SOFC 10 and the low-voltage line 20, less than 60 V, and so further improves the electrical safety of these components.

Sixth Embodiment

The following describes a sixth embodiment. Like numbers indicate like components similar to those in the first to the fifth embodiments, and their detailed descriptions are omitted.

Figure 9:
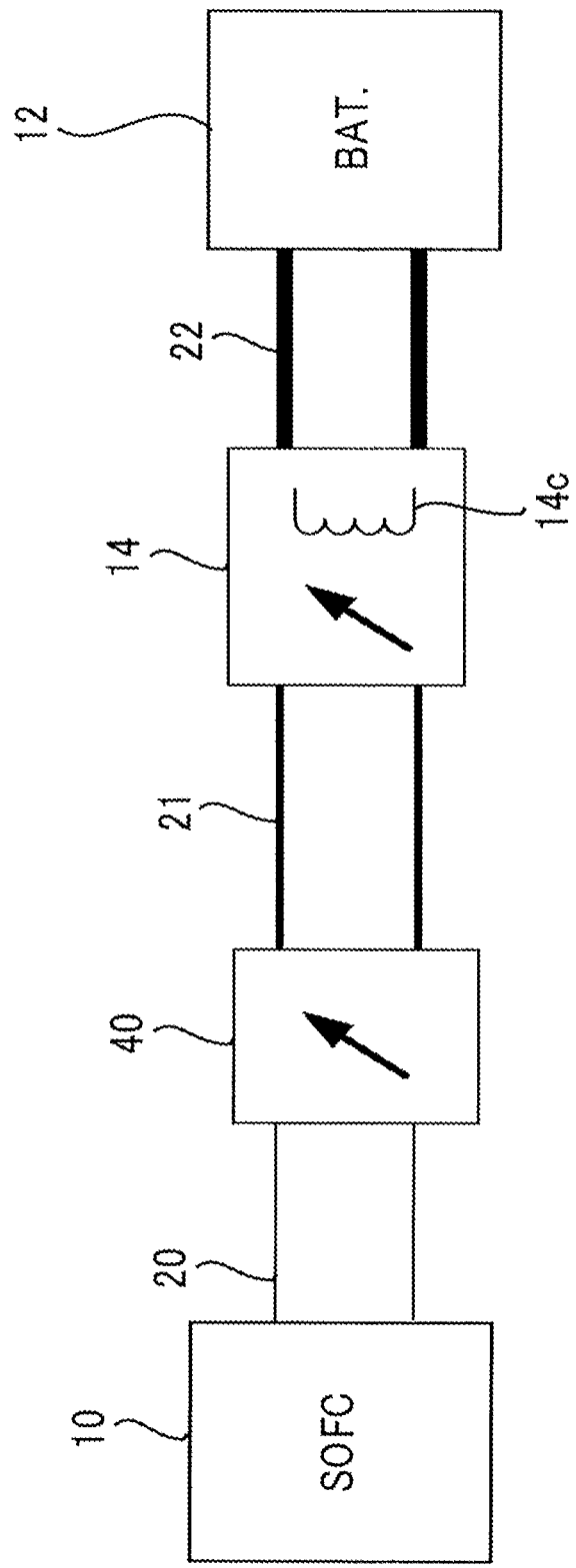
FIG. 9 describes the configuration of a power control system according to a sixth embodiment.

FIG. 9 describes the configuration of a power control system 100 according to the present embodiment. For simplicity, FIG. 9 shows the major configuration of the power control system 100 only.

As shown in the drawing, the power control system 100 of the present embodiment has a configuration such that the non-insulating boosting converter 40 and the FC insulating converter 14 of the fourth embodiment change their places. That is, in the power control system 100 of the present embodiment, the non-insulating boosting converter 40 is disposed between the SOFC 10 and the FC insulating converter 14. The other configuration is similar to the power control system 100 of the fourth embodiment.

In the power control system 100 of the present embodiment having such a configuration, the non-insulating boosting converter 40 boosts the output voltage from the SOFC 10 in the low-voltage line 20, and outputs the voltage to a middle-voltage line 21. The FC insulating converter 14 boosts the voltage across the middle-voltage line 21 and outputs the voltage to the high-voltage line 22. In this way the present embodiment boosts the output voltage from the SOFC 10 in two stages in the order of the non-insulating boosting converter 40 and the FC insulating converter 14, and then supplies the voltage to the high-voltage battery 12.

Specifically the present embodiment is configured so that the non-insulating boosting converter 40 in the first stage controls the output voltage from the SOFC 10 in accordance with the request from the high-voltage battery 12 by adjusting the auxiliary boosting ratio, and the FC insulating converter 14 in the second stage further boosts the voltage across the middle-voltage line 21 that is boosted by the non-insulating boosting converter 40, so as to adequately adjust the output voltage from the FC insulating converter 14 to the high-voltage line 22.

Similarly to the fifth embodiment, the present embodiment also is configured so that the total boosting ratio (auxiliary boosting ratio x basic boosting ratio) of the two-stage boosting by the non-insulating boosting converter 40 and the FC insulating converter 14 can be favorably adjusted in accordance with a change in requested power of the high-voltage battery 12 through a switching-control of the non-insulating boosting converter 40 having good responsiveness.

The power control system 100 according to the sixth embodiment as stated above has the following advantageous effects.

In the power control system 100 of the present embodiment, the non-insulating boosting converter 14 as the auxiliary booster is disposed between the SOFC 10 and the FC insulating converter 40.

With this configuration, the present embodiment favorably adjusts the output voltage from the SOFC 10 in two-stage boosting control by the non-insulating boosting converter 40 and the FC insulating converter 14 in accordance with the requested charge power of the high-voltage battery 12.

In the power control system 100 of the present embodiment, the SOFC 10 is disposed on the input side of the non-insulating boosting converter 40. With this configuration, a relatively large current may be input from the SOFC 10 to the non-insulating boosting converter 40 depending on the magnitude of the output power from the SOFC 10.

Considering such a situation, the circuit of the non-insulating boosting converter 40 of the present embodiment does not include an insulating transformer 14c and so is configured as a non-insulating converter. This avoids an increase in size of the non-insulating boosting converter 40 due to a large input current from the SOFC 10.

More specifically, when current is directly input from the SOFC 10 to a FC insulating converter 14 having an insulating transformer 14c, the components, such as winding and iron core, of the insulating transformer 14c needs to be large in size to receive a larger input current, if any. This causes an increase in size of the FC insulating converter 14 as a whole.

On the contrary, the non-insulating boosting converter 40 is mainly made up of circuit components, such as an inductor and a capacitor, and an increase in size of these circuit components due to a larger input current, if any, is limited as compared with the FC insulating converter 14. In this way the present embodiment having the non-insulating boosting converter 40 disposed between the SOFC 10 and the FC insulating converter 14 suppresses an increase in size of the system as a whole including the non-insulating boosting converter 40.

As a result, the power control system 100 of the present embodiment may include a SOFC 10 having a larger output because such a SOFC 10 does not lead to an increase in size of the system relative to an increase in input current to the non-insulating boosting converter 40 due to the large output. That is, the present embodiment may include a SOFC 10 having a larger output while suppressing an increase in size of the system.

Seventh Embodiment

The following describes a seventh embodiment. Like numbers indicate like components similar to those in the first to the sixth embodiments, and their detailed descriptions are omitted. The present embodiment describes one example of power control based on the configuration of the power control system 100 in the sixth embodiment.

Figure 10:
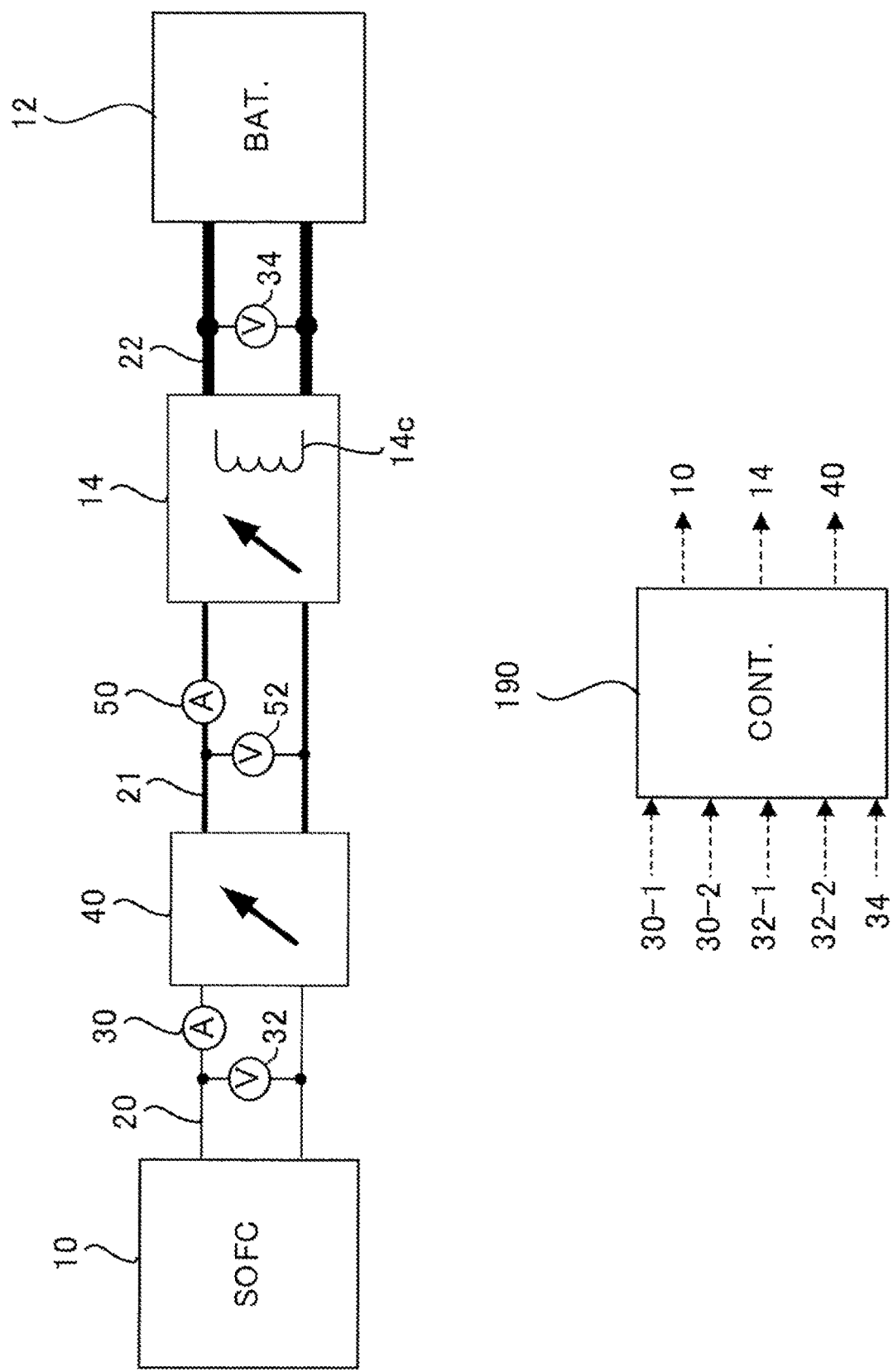
FIG. 10 describes the configuration of a power control system according to a seventh embodiment.

FIG. 10 describes the configuration of a power control system 100 in the present embodiment. As shown in the drawing, the power control system 100 of the present embodiment includes, in addition to the configuration of FIG. 9, a low-voltage side current sensor 30 and a low-voltage side voltage sensor 32, a middle-voltage side current sensor 50 and a middle-voltage side voltage sensor 52, and a high-voltage side voltage sensor 34 similarly to the fifth embodiment.

The low-voltage side current Ilow that the low-voltage side current sensor 30 of the present embodiment detects corresponds to the input current from the SOFC 10 to the non-insulating boosting converter 40. The middle-voltage side current Imed that the middle-voltage side current sensor 50 of the present embodiment detects corresponds to the input current from the non-insulating boosting converter 40 to the FC insulating converter 14.

The power control system 100 of the present embodiment includes a controller 190 having a similar hardware configuration to that of the fifth embodiment that controls the non-insulating boosting converter 40 and the FC insulating converter 14 based on the low-voltage side current detection value Ilowd, the low-voltage side voltage detection value Vlowd, the middle-voltage side current detection value Imedd, the middle-voltage side voltage detection value Vmedd, and the high-voltage side voltage detection value Vhighd detected by the low-voltage side current sensor 30, the low-voltage side voltage sensor 32, the middle-voltage side current sensor 50, the middle-voltage side voltage sensor 52 and the high-voltage side voltage sensor 34. The following describes the control by the controller 190 of the present embodiment in more details.

Figure 11:
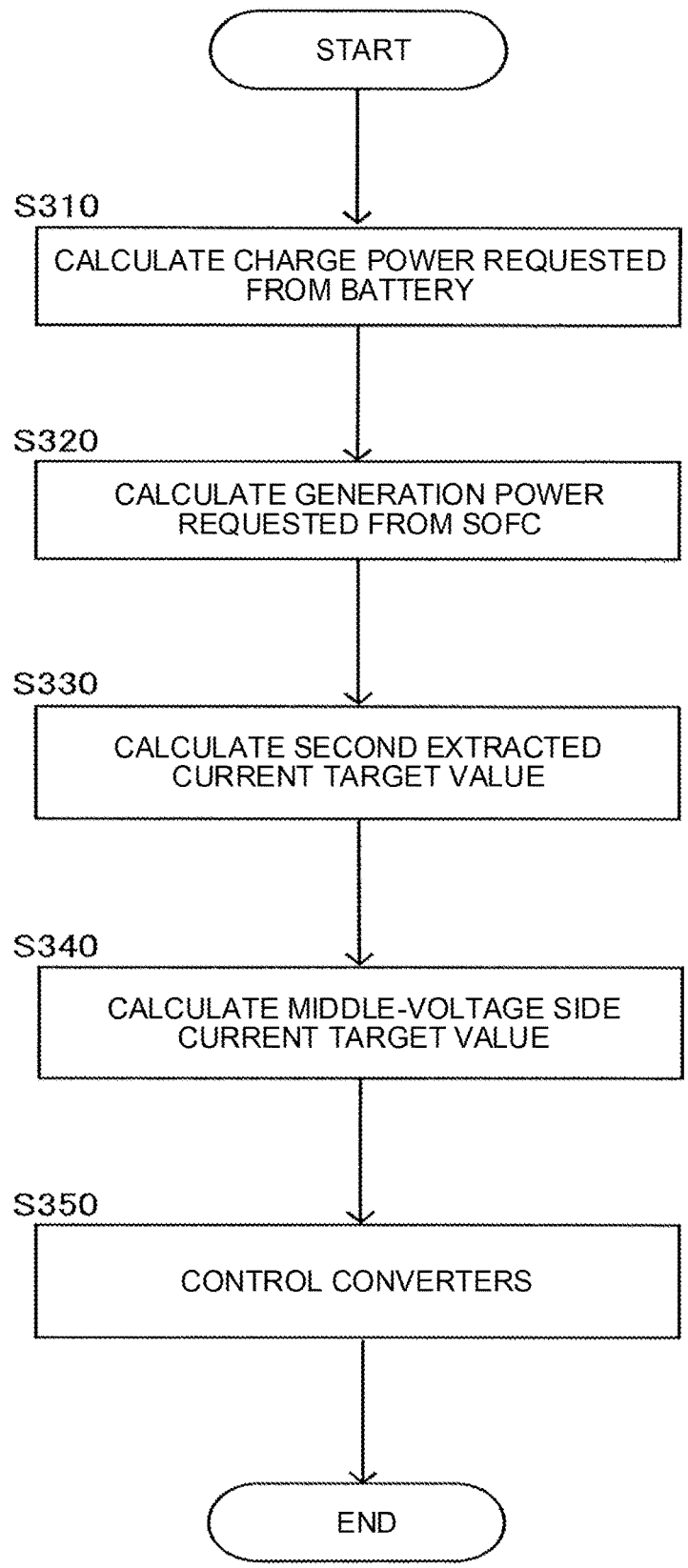
FIG. 11 is a flowchart showing the procedure of converter control in the seventh embodiment.

FIG. 11 is a flowchart to describe the control mode of the power control system 100 of the present embodiment. The order of the steps shown in the flowchart is not limited to the below-described order, and the order may be changed to the extent possible.

As shown in the drawing, at step S210, the controller 190 calculates requested charge power of the high-voltage battery 12 based on a detection value (or an estimated value) of the amount of charge of the high-voltage battery 12 similarly to the fifth embodiment.

At step S320, the controller 190 calculates requested generation power of the SOFC 10 based on the calculated requested charge power of the high-voltage battery 12.

At step S330, the controller 190 calculates an extracted current correction target value (hereinafter this may be called a "second extracted current target value") of the SOFC 10 and a middle-voltage side current target value based on the calculated requested generation power and the low-voltage side voltage detection value Vlowd.

The second extracted current target value is a target value of the extracted current (low-voltage side current Ilow) of the SOFC 10 that is calculated from the viewpoint of meeting a demand for the charge power of the high-voltage battery 12 and limiting the voltage of the low-voltage line 20 (low-voltage side voltage Vlow) so as not to exceed a certain upper limit.

To this end, the controller 190 of the present embodiment calculates the second extracted current target value by a calculation similar to the calculation of the first extracted current target value described in the fifth embodiment.

At step S340, the controller 190 calculates the middle-voltage side current target value based on the low-voltage side voltage detection value Vlowd, the middle-voltage side voltage detection value Vmedd, and the calculated second extracted current target value.

The middle-voltage side current target value is a target value of the middle-voltage side current Imed (corresponding to the output current of the non-insulating boosting converter 40) that is calculated from the viewpoint of limiting the voltage of the middle-voltage line 21 (middle-voltage side voltage Vmed) so as not to exceed a certain upper limit.

Specifically the controller 190 calculates supply power P by multiplying the low-voltage side voltage detection value Vlowd by the calculated second extracted current target value. Then the controller 190 calculates a basic middle-voltage side current target value based on the calculated supply power P. Then the controller 190 corrects the basic middle-voltage side current target value so that the middle-voltage side voltage detection value Vmedd is less than an upper-limit voltage Vlim, and sets the corrected value as the middle-voltage side voltage target value.

At step S350, the controller 190 controls the non-insulating boosting converter 40 and the FC insulating converter 14 based on the calculated second extracted current target value and the middle-voltage side current target value.

Specifically the controller 190 switching-controls the non-insulating boosting converter 40 and the FC insulating converter 14 so that the low-voltage side current detection value Ilowd and the middle-voltage side current detection value Imedd get closer to the second extracted current target value and the middle-voltage side current target value, respectively, and so adjusts the total boosting ratio (basic boosting ratio+auxiliary boosting ratio).

In this way the processing of these steps of the present embodiment, especially steps S330 to S350, controls both of the low-voltage side voltage Vlow and the middle-voltage side voltage Vmed to be less than the upper-limit voltage Vlim.

The power control system 100 according to the seventh embodiment as stated above has the following advantageous effects.

The power control system 100 of the present embodiment further has the controller 190 that is a boosting control unit to control the non-insulating boosting converter 40 and the FC insulating converter 14. The controller 190 controls the boosting ratio of the non-insulating boosting converter 40 at least based on the output voltage from the SOFC 10 (low-voltage side voltage Vlow) and the voltage across the high-voltage battery 12 (high-voltage side voltage Vhigh).

With this configuration, boosting of the output voltage from the SOFC 10 in two stages by the non-insulating boosting converter 40 and the FC insulating converter 14 can be favorably executed through a control of the non-insulating boosting converter 40 in accordance with the requested charged power of the high-voltage battery 12.

The controller 190 of the present embodiment limits the low-voltage side voltage Vlow corresponding to the output voltage from the SOFC 10 and the middle-voltage side voltage Vmed corresponding to the output voltage from the non-insulating boosting converter 40 to be less than a predetermined value (upper-limit voltage Vlim) (step S330 to step S350 in FIG. 11).

In this way the present embodiment provides a specific example of the embodiment to supply power to the high-voltage battery 12 in accordance with the requested charge power, and keep both of the low-voltage side voltage Vlow and the middle-voltage side voltage Vmed to be a certain value or less.

In the power control system 100 of the present embodiment, the insulating transformer 14c of the FC insulating converter 14 electrically insulates between the middle-voltage line 21 and the high-voltage line 22. With this configuration, when both of the low-voltage side voltage Vlow and the middle-voltage side voltage Vmed are kept less than the upper-limit voltage Vlim, the operating voltage of the middle-voltage line 21, the non-insulating boosting converter 40, the low-voltage line 20 and the SOFC 10 can be substantially less than the upper-limit voltage Vlim. That is, this improves electrical safety of these components.

Especially when the power control system 100 of the present embodiment is mounted on an automobile, the upper-limit voltage Vlim may be set at a value less than 60 V. This means that the middle-voltage line 21, the non-insulating boosting converter 40, the low-voltage line 20 and the SOFC 10 can be components substantially having the operating voltage less than 60 V, and so they can be excluded from the above-stated high-voltage safety requested components.

As a result, when the power control system 100 of the present embodiment is mounted on an automobile, the degree of freedom of layout on the vehicle improves for many components including the middle-voltage line 21, the non-insulating boosting converter 40, the low-voltage line 20 and the SOFC 10.

In the power control system 100 of the present embodiment, the SOFC 10 may be configured to have a substantial maximum output voltage less than 60 V. Together with the control to keep the low-voltage side voltage Vlow and the middle-voltage side voltage Vmed to be less than 60 V as stated above, this configuration keeps the components in the low-voltage system, including the SOFC 10 and the low-voltage line 20, and the components in middle-voltage system, including the middle-voltage line 21, less than 60 V, and so further improves the electrical safety of these components.

The embodiments of the present invention as stated above are merely a part of examples of the application of the present invention, and the technical scope of the present invention is not limited to the specific constitutions of the above embodiments.

For instance, the control mode of the FC insulating converter 14 or the non-insulating boosting converter 40 described above in the third embodiment, the fifth embodiment, and the seventh embodiment are examples, and they may be modified variously. Specifically the control of the FC insulating converters 14-1 and 14-2 in the third embodiment may be performed with any appropriate parameter instead of or together with the parameter, such as the high-voltage side voltage Vhigh, to control the FC insulating converters 14-1 and 14-2, as long as their output currents are adjustable in accordance with the output characteristics of the SOFCs 10-1 and 10-2.

Similarly the control of the FC insulating converter 14 or the non-insulating boosting converter 40 in the fifth embodiment and the seventh embodiment may be performed with any appropriate parameter instead of or together with the parameters used for the control in these fifth embodiment and seventh embodiment, as long as these parameters enable the control of the low-voltage side voltage Vlow or the low-voltage side voltage Vlow and the middle-voltage side voltage Vmed to be less than the upper-limit voltage Vlim while supplying power in accordance with the requested charge power of the high-voltage battery 12.

The above embodiments describe the example where the FC insulating converter 14 including the insulating power converter implements the insulating function with the insulating transformer 14c.

Instead of the FC insulating converter 14 in the above embodiments, an insulating power converter may be used, which is configured (including such circuit components) to enable transmission of the energy corresponding to the power to be supplied to the high-voltage battery 12 from the input to the output while keeping substantial electrical insulation between the input and the output.

In other words, any configuration, such as a circuit component, that is a replacement of the insulating transformer 14c described in the above embodiments may be not only a technique existing before the filing date of the present application but also a new technique found after the filing date. Such a configuration is not excluded from the technical scope of the present invention as long as it functions as the insulating transformer 14c as required in the present invention as stated above.

The second to fourth embodiments describe the example including the two SOFCs 10-1 and 10-2 connecting to the FC insulating converter 14-1 and the FC insulating converter 14-2, respectively. Instead of these embodiments, n pieces of (n≥3) SOFCs 10 may be arranged, and n pieces of FC insulating converters 14 may be individually connected to these n pieces of SOFCs 10. In this way the extracted current may be individually controlled in accordance with the output characteristics of these n pieces of SOFCs 10.

A group of SOFCs 10 made up of a predetermined number of pieces of SOFCs 10 in then pieces of SOFCs 10 may be formed, and one FC insulating converter 14 may connect to the group to control the extracted current of the SOFCs 10 as the group.

The configuration of the second to fourth embodiments and the configuration of the fifth to seventh embodiments may be combined in any fashion. In one example, the power control system 100 according to the second to fourth embodiment including two SOFCs 10-1 and 10-2 and FC insulating converters 14-1 and 14-2 connecting to these SOFCs 10-1 and 10-2, respectively, may include the non-insulating boosting converter 40.

More specifically in the power control system 100 of the second to fourth embodiments, the non-insulating boosting converter 40-1 (40-2) may be disposed between the SOFC 10-1 (10-2) and the FC insulating converter 14-1(14-2) or the FC insulating converter 14-1 (14-2) and the high-voltage battery 12, and the control described in the fifth embodiment and the seventh embodiment may be executed to the FC insulating converter 14-1 (14-2) and the non-insulating boosting converter 40-1 (40-2).

The insulating transformer 14c of the FC insulating converter 14 in the fifth to seventh embodiments may be configured to exert an electrical insulating function only and not to exert a boosting function based on the number of turns. Specifically the number of turns may be equal between the primary coil and the secondary coil of the insulating transformer 14c, for example, so that the insulating transformer 14c has the boosting ratio of 1:1. Then the output voltage from the SOFC 10 may be boosted with a boosting circuit including a component other than the insulating transformer 14c in the FC insulating converter 14 and with the non-insulating boosting converter 40.

The above embodiments describe the example of the SOFC 10 as the power generation device. In another embodiment, another power generation device, such as an internal combustion engine or an alternator, may be used. The power control system 100 of the above embodiments may be applied to any vehicle other than automobiles, such as a railroad vehicle, equipped with an external load (motor) driven while receiving the power, or other apparatuses equipped with an external load driven by power.

The invention claimed is:

1. A power control system comprising:
    a power generation device configured to generate low-voltage power;
    a high-voltage battery configured to be charged with power generated by the power generation device;
    an external load configured to receive power from the high-voltage battery; and
    a power converter connecting between the power generation device and the high-voltage battery, wherein
    the power converter includes an insulating power converter,
    the high-voltage battery is configured to have a maximum output voltage that is a predetermined voltage or more, the predetermined voltage being a standard for determination whether a component in an apparatus equipped with the power control system is a high-voltage safety requested component or not, the high-voltage safety requested component being required to meet a certain safety request,
    the power generation device is configured to have a maximum output voltage less than a predetermined voltage, the predetermined voltage being a standard for determination whether a component in an apparatus equipped with the power control system is a high-voltage safety requested component or not, the high-voltage safety requested component being required to meet a certain safety request.

2. The power control system according to claim 1, wherein
    the insulating power converter has a boosting circuit configured to boost an output voltage from the power generation device with a predetermined boosting ratio.

3. The power control system according to claim 2, wherein
    the boosting circuit includes an insulating transformer.

4. The power control system according to claim 1, further comprising:
    at least two power generation devices, wherein
    the power generation devices are each connected to the insulating power converter.

5. The power control system according to claim 4, further comprising
    a transformer individually control unit configured to individually control the insulating power converters each connecting to the power generation device.

6. The power control system according to claim 5, wherein
    the transformer individually control unit individually controls extracted currents of each of the power generation devices so that a difference in output voltage between each of the power generation devices is a predetermined value or lower.

7. The power control system according to claim 1, wherein
    the power converter further includes an auxiliary booster configured to boost an output voltage from the power generation device with a predetermined boosting ratio.

8. The power control system according to claim 7, wherein
    the auxiliary booster is disposed between the insulating power converter and the high-voltage battery.

9. The power control system according to claim 8, further comprising:
    a boosting control unit configured to control the insulating power converter and the auxiliary booster, wherein
    the boosting control unit controls a boosting ratio of the auxiliary booster at least based on an output voltage from the power generation device and a voltage across the high-voltage battery.

10. The power control system according to claim 9, wherein
   the boosting control unit controls an output voltage from the power generation device to be less than a predetermined value.

11. The power control system according to claim 7, wherein
   the auxiliary booster is disposed between the power generation device and the insulating power converter.

12. The power control system according to claim 11, further comprising
   a boosting control unit configured to control the auxiliary booster and the insulating power converter, wherein
   the boosting control unit controls a boosting ratio of the insulating power converter at least based on an output voltage from the power generation device and a voltage across the high-voltage battery.

13. The power control system according to claim 12, wherein
   the boosting control unit controls an output voltage from the power generation device and an output voltage from the auxiliary booster to be less than a predetermined value.

14. The power control system according to claim 1, wherein
   the power generation device is configured to have a maximum output voltage less than 60 V.

15. The power control system according to claim 1, wherein
   the power control system is mounted on a vehicle, and the external load is a driving motor.

* * * * *